April 22, 1941.          P. J. McCULLOUGH ET AL          2,238,911
                              CONNECTOR BOLT
                           Filed Oct. 17, 1936              2 Sheets-Sheet 1
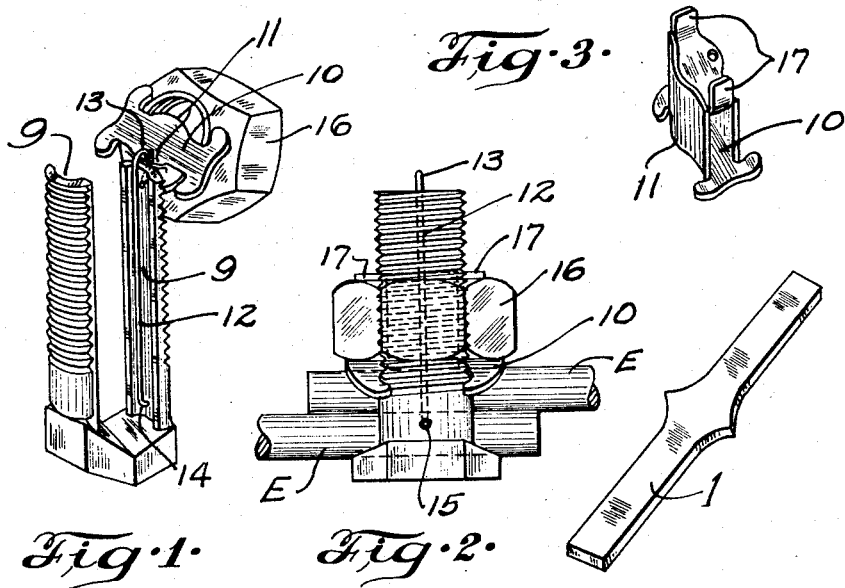
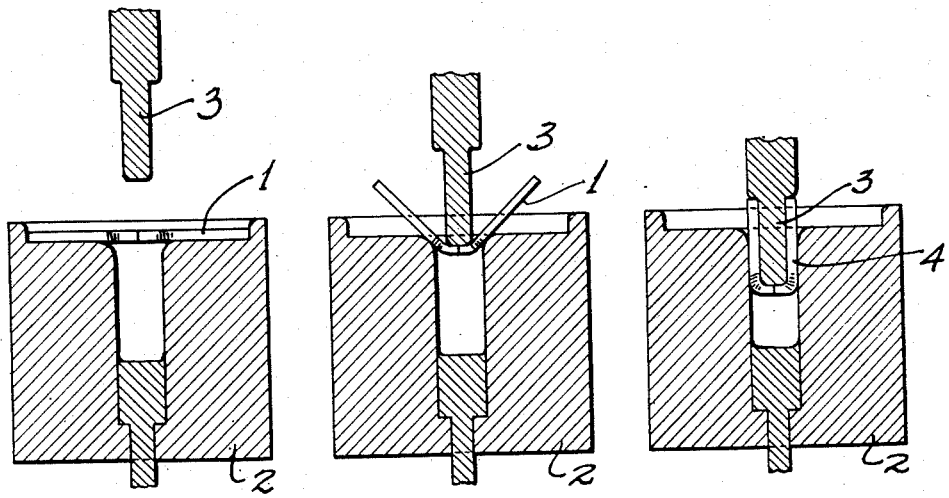
Inventors
Paul J. McCullough
Joseph Pavelka Sr.
By Rodney Bedell
    Attorney Inventors
Paul J. McCullough
Joseph Pavelka Sr.
By Rodney Bedell
Attorney Patented Apr. 22, 1941

2,238,911

UNITED STATES PATENT OFFICE 2,238,911

CONNECTOR BOLT

Paul J. McCullough and Joseph Pavelka, Sr., St. Louis, Mo.; said McCullough assignor to said Pavelka Application October 17, 1936, Serial No. 106,119

6 Claims. (Cl. 24—243)

The invention relates to electric connectors of the split bolt type. Preferably the invention includes a complete bolt shank, washer, nut, and means for maintaining the parts assembled when the nut is screwed off of the end of the bolt shank.

An object of the invention is to simplify the means for maintaining assembly of the bolt shank, washer and nut whereby the expense of this type of connector bolt is reduced.

This and other detail objects of the invention will be apparent from the following description and from inspection of the accompanying drawings, in which—

Figure 1 is a perspective view of a completed bolt including washer and nut and retaining elements for the latter.

Figure 2 is a side elevation of the same structure with nut screwed down upon and clamping a pair of wires.

Figure 3 is a detail of the washer.

Figure 4 is a perspective view of a flat blank from which the bolt is formed.

Figures 5, 6, 7 and 8 are transverse sections through a forming die and punch illustrating the first steps in the formation of the bolt.

Figure 12:
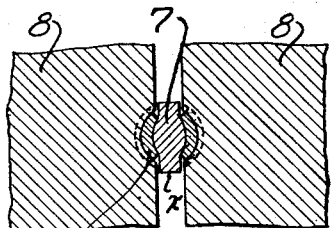
Figure 11:
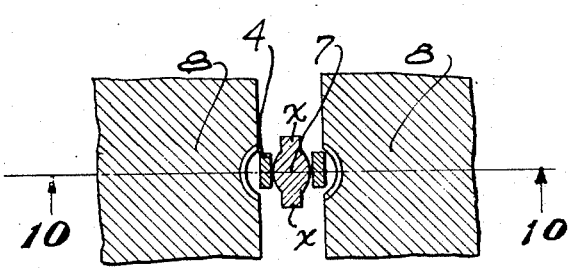
Figure 11 is a transverse horizontal section taken on the line 11—11 of Figure 10.

Figure 12 corresponds to Figure 11 but shows the parts at the completion of the operation illustrated.

Figure 10:
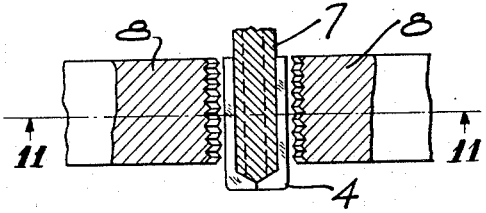
Figure 10 is a section through a shaping and threading die and anvil with the blank shown in Figure 8 in place to be operated upon. The figure is taken on the line 10—10 of Figure 11.
Figure 13:
Figure 14:

Figures 13 and 14 illustrate, respectively, modified anvil structures which may be used in the operations indicated in Figures 10, 11 and 12.

Figure 15:
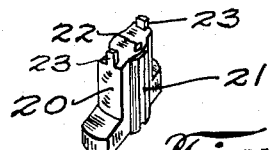

Figure 15 is a perspective of a modified form of washer.

Figure 8:
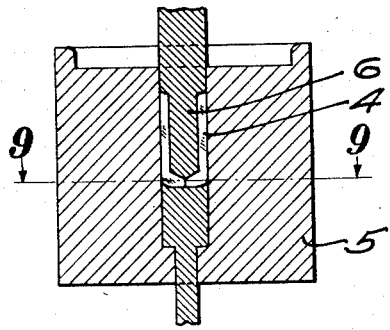
Figure 9:
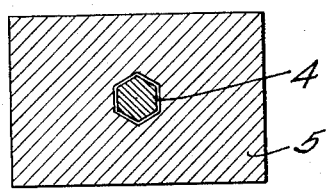
Figure 9 is a transverse horizontal section on the line 9—9 of Figure 8.

The blank 1 illustrated in Figure 4 may be stamped from flat rolled sheet or bar material and is of substantially uniform thickness from end to end with the opposite faces comprising parallel plane surfaces. The blank is first placed into a forming die 2 and a punch 3 descends, as indicated in Figures 5, 6 and 7, bending blank 1 into the U-shaped structure indicated at 4 in Figure 7. The U member 4 is then transferred to die 5, Figure 8, in which the punch 6 cooperates with the base of the die to give the cross bar of the U member a flattened head with a finished hexagonal contour as indicated in Figure 9.

In the next operation the U member 14 is placed over an anvil or mandrel 7 (Figures 10, 11, 12), having a cross section contour with convex sides, and the legs of the blank are each bent over these sides of the anvil by movements of the concave threaded faces of cooperating dies 8. This one operation gives the legs of the blank a concavo-convex form and impresses the threads in the convex faces of the legs, the legs remaining substantially the same thickness from edge to edge and remaining substantially the same length. The lugs X on the anvil 7 engage the edges of the blank as it is bent around the anvil and prevent the edges from thinning out. The shaping of the bolt legs to arcuate contours and the impressing of the threads is effected without causing any substantial flow of the metal and, accordingly, harder material may be used than would be practical with stamped out bolts as previously formed in which the legs are compressed between die parts by heavy pressure and are substantially reduced in sectional area during this process and portions are extruded beyond the compressing elements of the dies and must be trimmed away before the threads are impressed for the finished product.

The concavo-convex cross section of the legs produced by the last operation described is well illustrated at 9 in Figure 1. Bolts of this type are commonly equipped with washers which extend through the slot-like passage between the legs and rest upon the electrical wires E to be connected to protect the latter from cutting by the connector bolt nut. Such a washer stamped from sheet metal as shown at 10 may include projections 11 which extend inwardly of the concavities 9 in the bolt legs. The washer may be retained in assembly with the bolt by a wire 12 having a reverse bend 13 at one end with the terminal inserted into a hole drilled in the end of the bolt leg and having the other end 14 bent laterally and inserted through a hole extending transversely of the leg in the inner end thereof, the wire being riveted over as indicated at 15 in Figure 2.

A wire and washer assembly as shown is easily effected as the wire 12 does not need to fit the holes closely. The wire may extend substantially the full length of the bolt leg as, lying within the concavity of the leg, it does not interfere with the application of the bolt over connector wires. A nut 16 is internally threaded to be screwed over the threads in the bolt legs, and assembly of the nut, washer and bolt shank is maintained by ears 17 on the washer which may be bent over the upper face of the nut, as shown in Figure 2, to hold the same assembled with the washer although permitting relative rotation of the nut and washer.

It is not essential that the concavity in the bolt leg be arcuate and Figures 13 and 14 illustrate, respectively, anvils 18 and 19 which may be substituted for anvils 7 and will give the inner face of the bolt leg a concave contour formed of three or two straight faces accordingly.

While the sheet metal washer 10 is adequate for the intended purpose, it is customary to use solid washers which have been stamped or machined, and Figure 15 illustrates such a washer 20 having a groove 21 and an aperture 22 at one side to accommodate the retaining wire and also having ears 23, corresponding to ears 17 of washer 10, to retain the nut.

Those familiar with the art will readily apprehend from the description and the accompanying drawings that the objects of the invention stated in the introductory portion of this specification may be attained to a marked degree. The forming of the bolt requires comparatively little pressure by the dies because the flat shaped portions of the blank are bent around the anvil by the threading die rather than being changed in cross sectional area by heavy pressure which results in extrusion, changing its grain formation and putting heavy load upon the dies. The threads will be sharp and full from edge to edge of the leg. Aside from drilling the holes for the ends of wire 12, no machine work on the bolt is required and it may be used as it comes from the bending and forming operation.

Reference is made to applicants' copending application, Serial No. 365,256, filed November 12, 1940, which copending application is a division of the present application and covers the method of making the bolt.

It is obvious variations in the bolt, other than those referred to, may be made without departing from the spirit of the invention and the exclusive use of such modifications as come within the scope of the claims is contemplated.

What is claimed is:

1. A connector bolt comprising spaced legs with threaded exteriors, a nut threaded to screw over said legs, a washer below and secured to said nut and slidable between said legs, a wire secured to the inside face of one of said legs near the inner end thereof and passing through said washer and along said inner face but spaced from the latter and extending over the outer end of said leg and secured thereto, said wire slidably retaining the washer upon the bolt while permitting it to follow the nut and to pivot with the latter about the outer end of the bolt.

2. A connector bolt comprising spaced legs with threaded exteriors, a nut threaded to screw over said legs, a washer below and secured to said nut and slidable between said legs, at least one of said legs having a longitudinal recess and said washer having a projection extending into said recess, a wire extending along said recess and through said washer projection and secured at its ends to said leg and providing sliding movement of said washer along said legs.

3. A connector bolt comprising spaced legs with threaded exteriors, a nut threaded to screw over said legs, a washer below and secured to said nut and slidable between said legs, at least one of said legs having a concave inner face substantially from end to end, a wire positioned in and extending longitudinally of the concavity of said leg face and secured at its opposite ends to said leg, said washer having an aperture receiving said wire to retain said washer on said bolt.

4. A connector bolt comprising spaced legs with threaded exteriors, a nut threaded to screw over said legs, at least one of said legs having a recessed inner face, a wire retainer positioned in and extending longitudinally of the recess in said leg and in spaced relation to the wall of said recess and secured at its ends to said leg, and means maintaining said nut in slidable engagement with said retainer.

5. A connector bolt having spaced legs with threaded exterior faces, at least one of said legs having a concave inner face, a nut retainer held against substantial movement relative to said leg and positioned in the concavity of said leg and leaving space between said legs unobstructed by said retainer to freely receive conductors between said legs and throughout the length of said retainer.

6. A connector bolt having spaced legs with threaded exterior faces, at least one of said legs having a concave inner face, a nut retainer positioned in the cavity of said inner face with its end portions secured to said leg to hold said retainer in fixed position relative to said leg.

JOSEPH PAVELKA, Sr.
PAUL J. McCULLOUGH.